Patented Apr. 3, 1923.

1,450,688

UNITED STATES PATENT OFFICE.

JOHN T. LAWRENCE, OF NEWARK, NEW JERSEY.

PAINT.

No Drawing. Application filed September 19, 1921. Serial No. 501,693.

*To all whom it may concern:*

Be it known that I, JOHN T. LAWRENCE, a citizen of the United States, and a resident of Newark, Essex County, and State of New Jersey, have invented certain new and useful Improvements in Paints, of which the following is a specification.

The objects of my invention are to provide a paint of a lasting, permanent nature which will be proof against the action of fire, acid, sun, water and rust, and which can be manufactured relatively inexpensively from materials easily obtainable.

These objects are attained through certain novel combinations of elements, examples of which will be given.

In manufacturing a pure white paint, I have used the following formula: poppy seed oil 80 parts, barium sulphate 12 parts, sodium carbonate 12 parts, prepared white zinc 24 parts, white lead 12 parts, zinc sulphate 16 parts, silica 12 parts, ground white antimony 6 parts, commercial yellow rosin 6 parts, water white rosin 6 parts.

Commercial "nut oil" may be used in place of the poppy seed oil, and except for its "yellowing" factor, linseed oil might be used as a substitute. The oil is described with the other elements, excepting the yellow and white rosin which latter are boiled at approximately 600 degrees F. for a period of about one-half hour before being added. The yellow and white rosin give "body" to the paint and are used in the proportions of about one pint to the gallon of paint.

By the use of suitable pigments, the white paint thus produced can be tinted or colored to thirty-six or more different shades.

A blood red paint is produced according to the following: linseed oil, 100 parts, described with: barium sulphate 16 parts, sodium carbonate 12 parts, silica 12 parts, madder lake 4 parts, red lead 12 parts, red orpiment 12 parts, red antimony 12 parts, with yellow and white rosin in about the proportion of one pint to the gallon.

The yellow and white rosin are usually added after being boiled as before described.

The color may be heightened with American vermillion.

For black paint, I usually employ the following: black lead 6 pounds, blue black 4 pounds, drop black 4 pounds, black antimony 6 pounds, silica 6 pounds, borax 4 pounds.

These ingredients are ground in Japan or oil, either linseed or creosote and yellow and white rosin boiled as before are added in the proportion of about one pint to the gallon.

The paints produced with these novel combinations of elements are of a permanent lasting nature capable of withstanding the action of fire, sun, acid and water, without blistering or breaking. Furthermore, this paint does not crack or peel, is highly protective to the surface to which it is applied, works freely with the brush and requires no special skill in handling. The paint is useful for both wood and metal surfaces, has high penetrating qualities, is relatively quick drying and has the peculiar property that under heat conditions the body hardens instead of liquefying as in other paints. This is a particular advantage where it is desired to keep one color from running into the other.

What I claim is:

1. A paint including an oil with barium sulphate, sodium carbonate, white lead, zinc sulphate and silica.

2. The combination of claim 1 with white zinc, white antimony, commercial yellow rosin and water white rosin.

3. A paint including the following ingredients is substantially the proportions named: oil 80 parts, barium sulphate 12 parts, sodium carbonate 12 parts, prepared white zinc 24 parts, white lead 12 parts, zinc sulphate 16 parts, silica 12 parts, ground white antimony 6 parts, commercial yellow rosin 6 parts, water white rosin 6 parts.

4. The combination of claim 1 with white zinc, white antimony and rosin.

In witness whereof, I have hereunto set my hand this 17th day of September, 1921.

JOHN T. LAWRENCE.